May 19, 1959 V. P. HARVEY ET AL 2,887,011
FUSE SETTER COMBINED WITH LOADING MECHANISM
Filed May 24, 1945 12 Sheets-Sheet 7
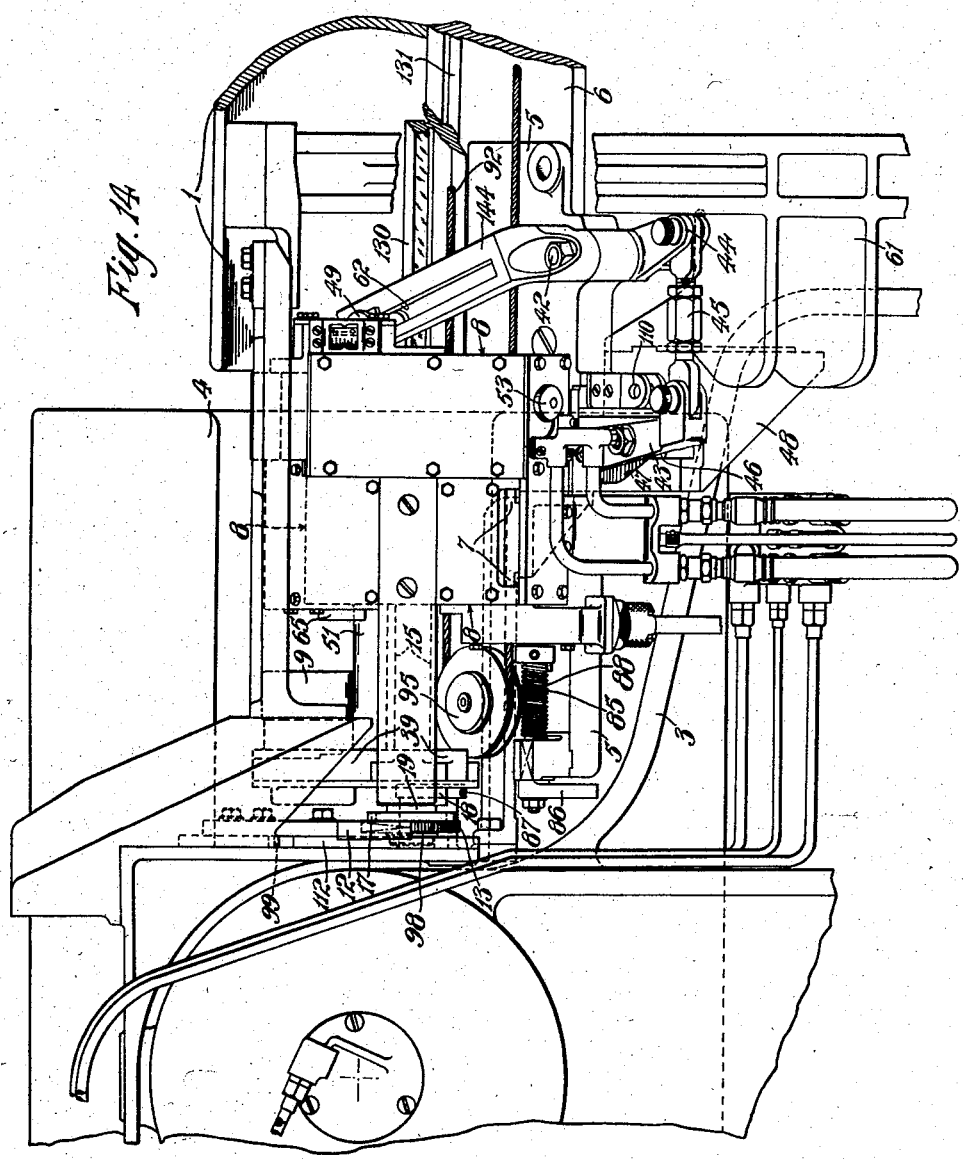
Inventors
Valentine P. Harvey and
Frank Parry
by Cushman, Darby + Cushman
Attorneys

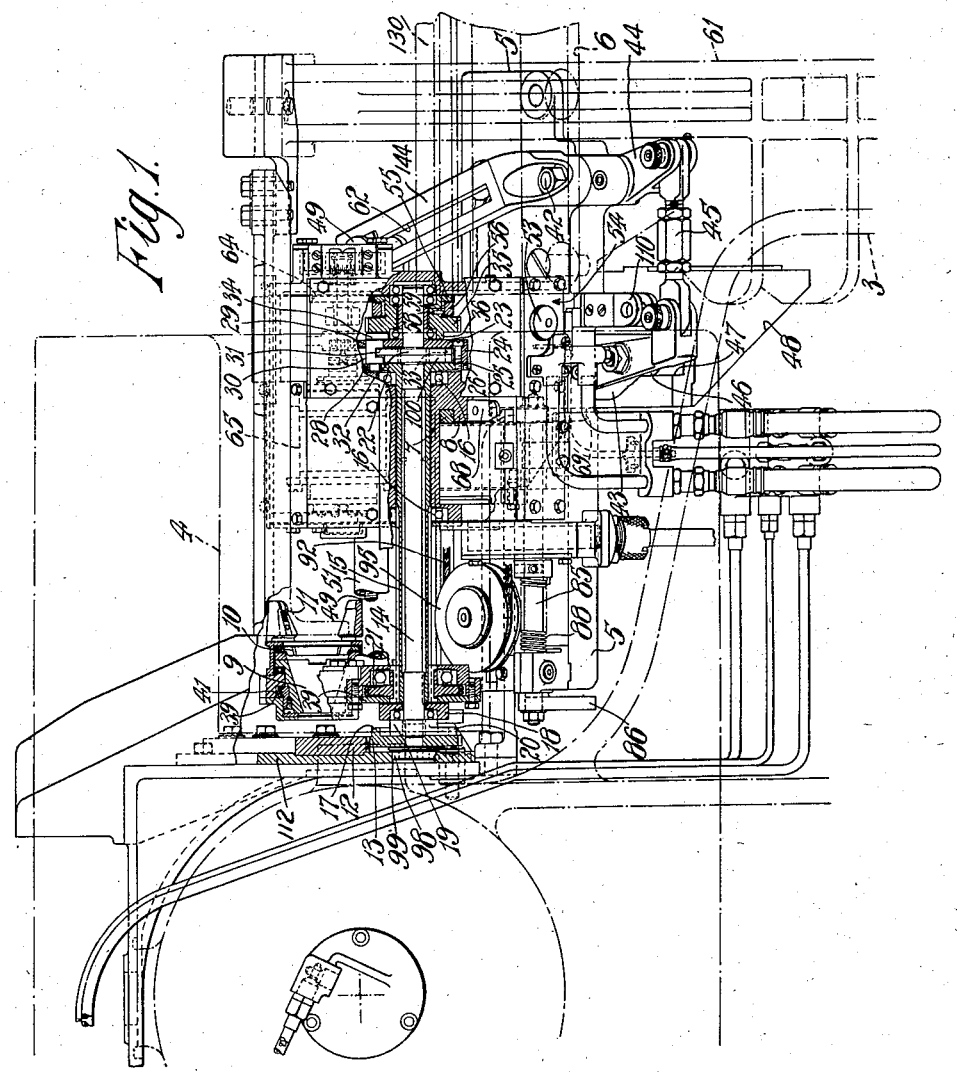

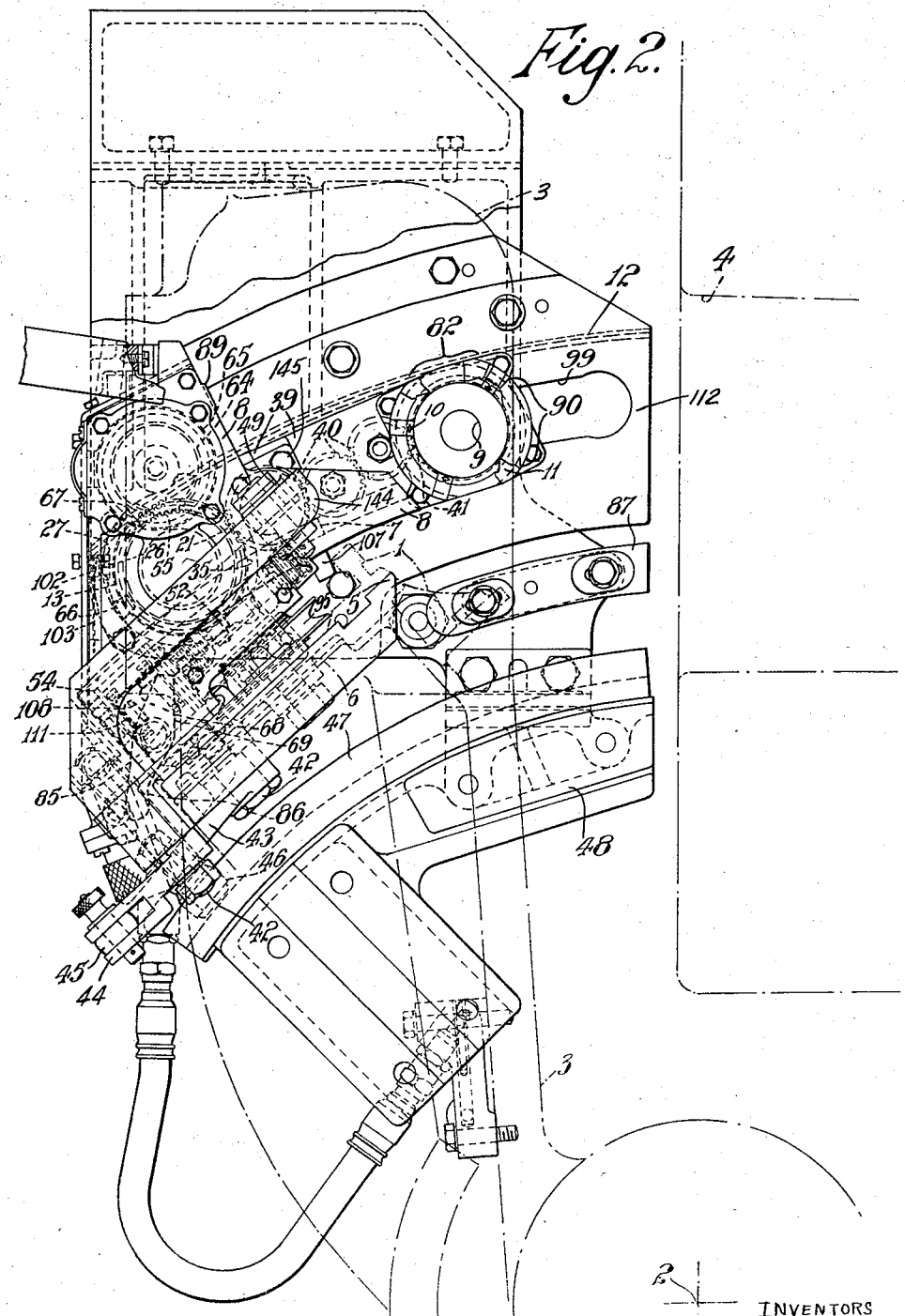

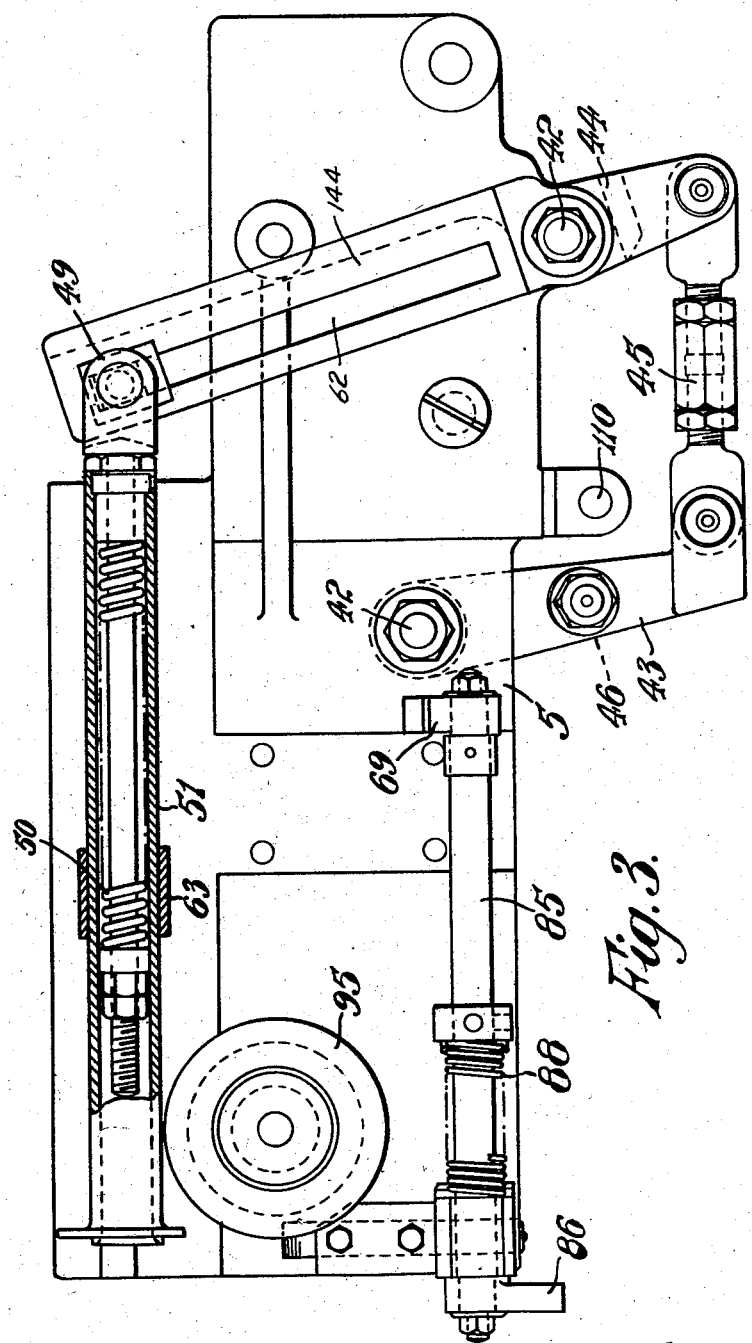

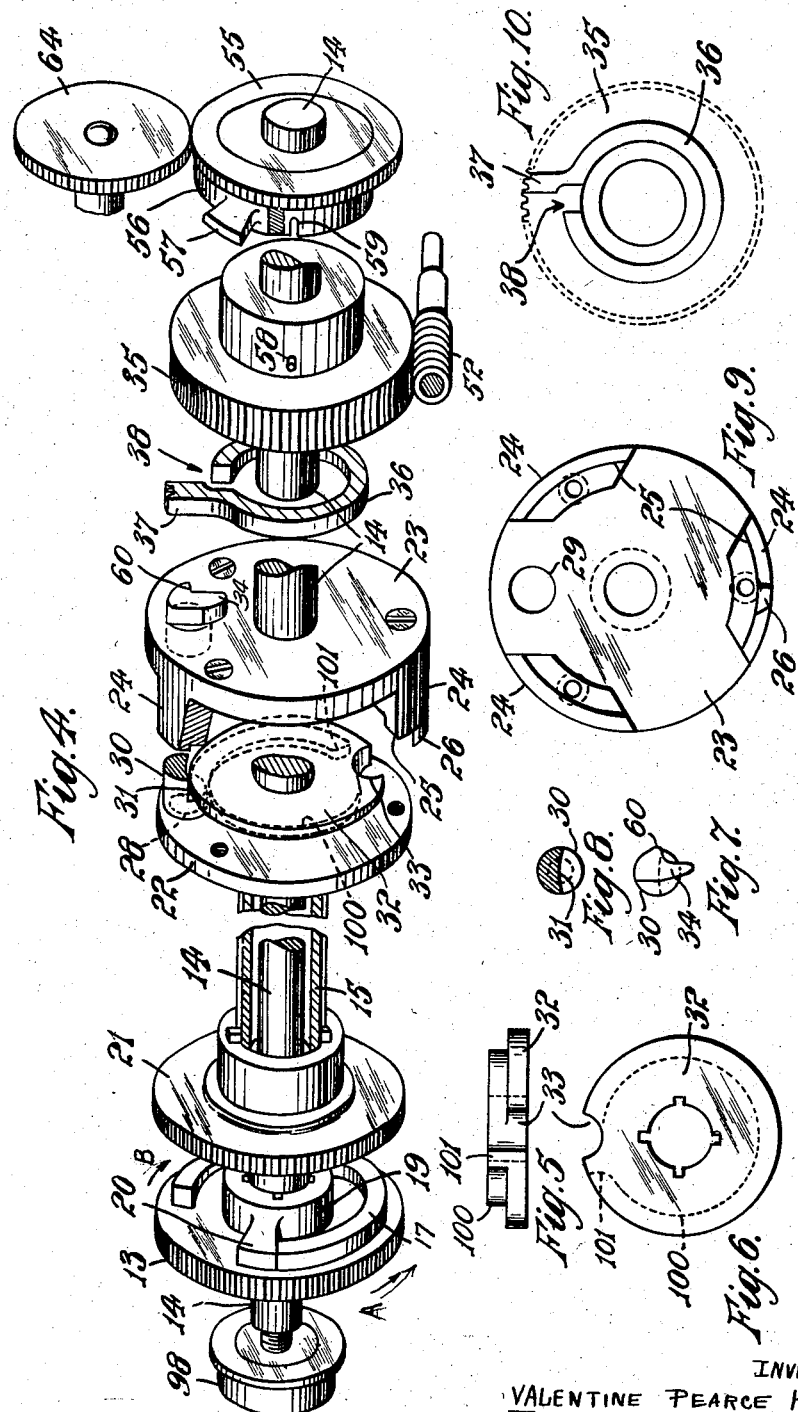

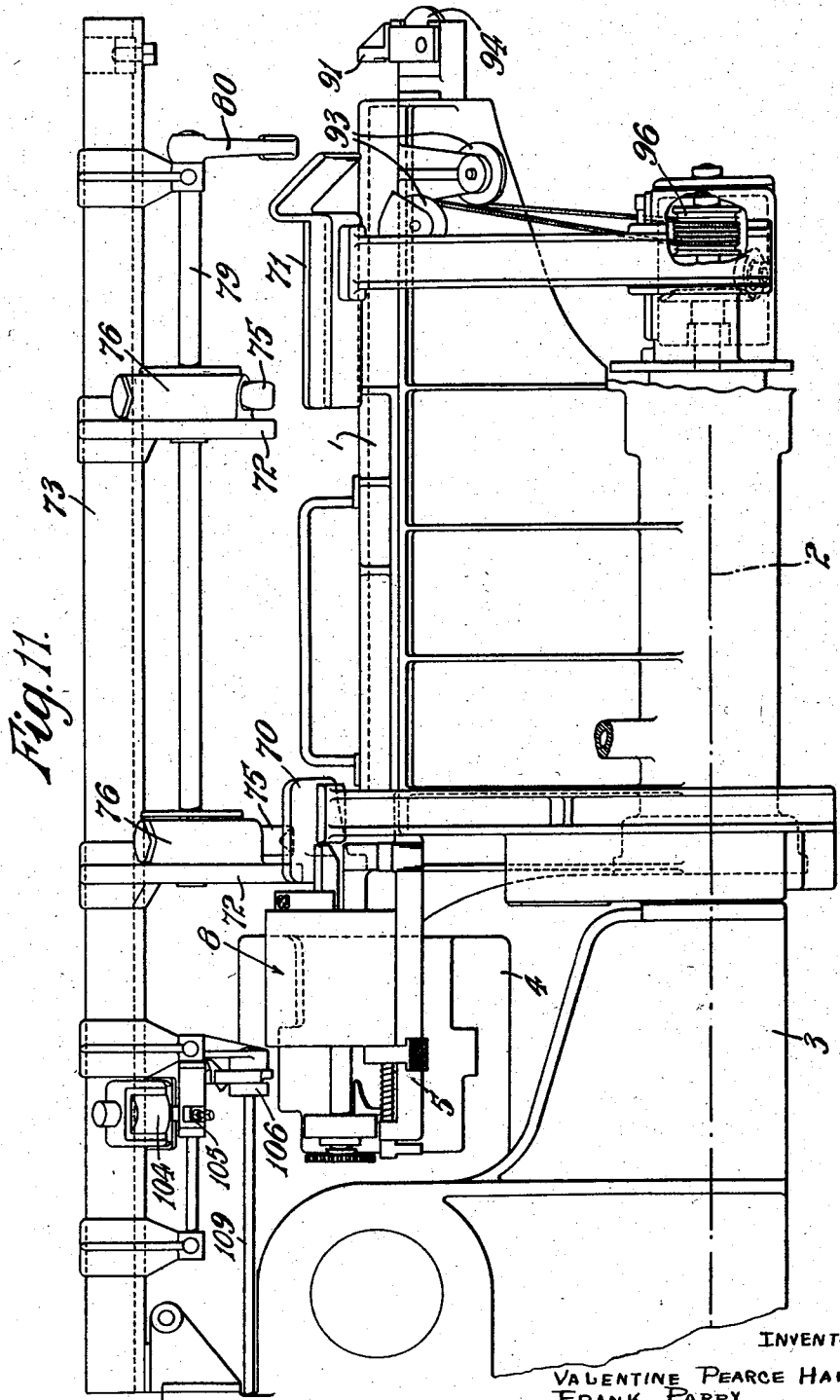

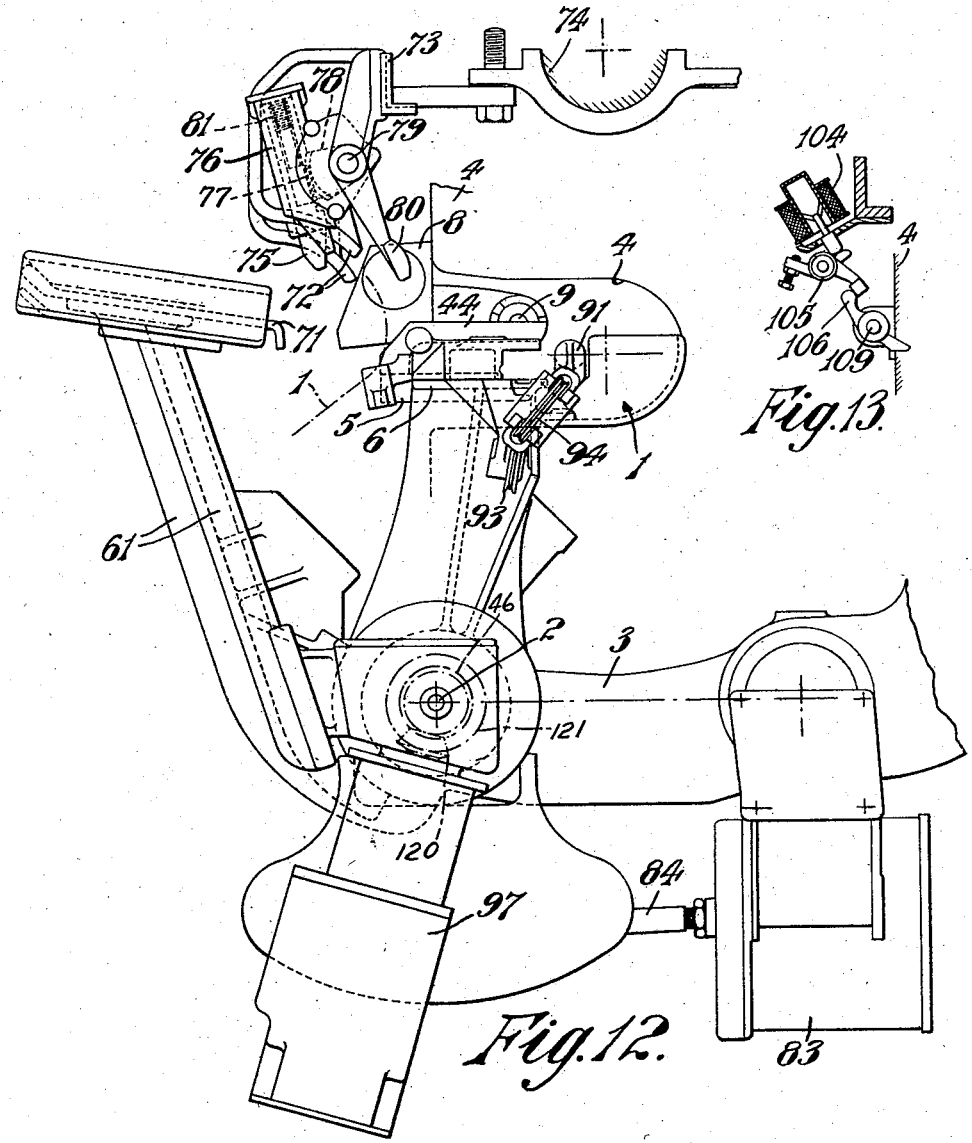

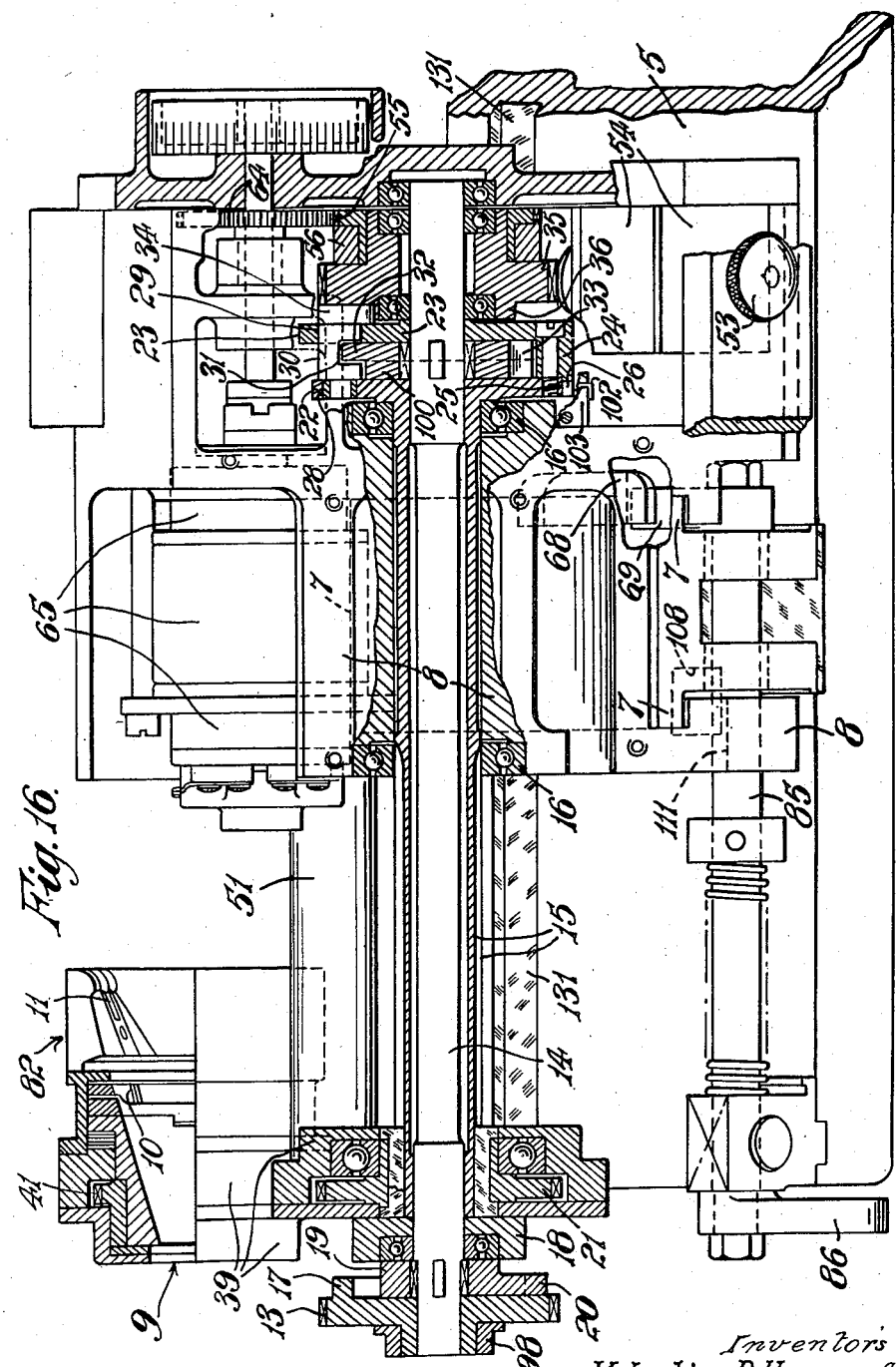

May 19, 1959     V. P. HARVEY ET AL     2,887,011
FUSE SETTER COMBINED WITH LOADING MECHANISM
Filed May 24, 1945     12 Sheets-Sheet 10
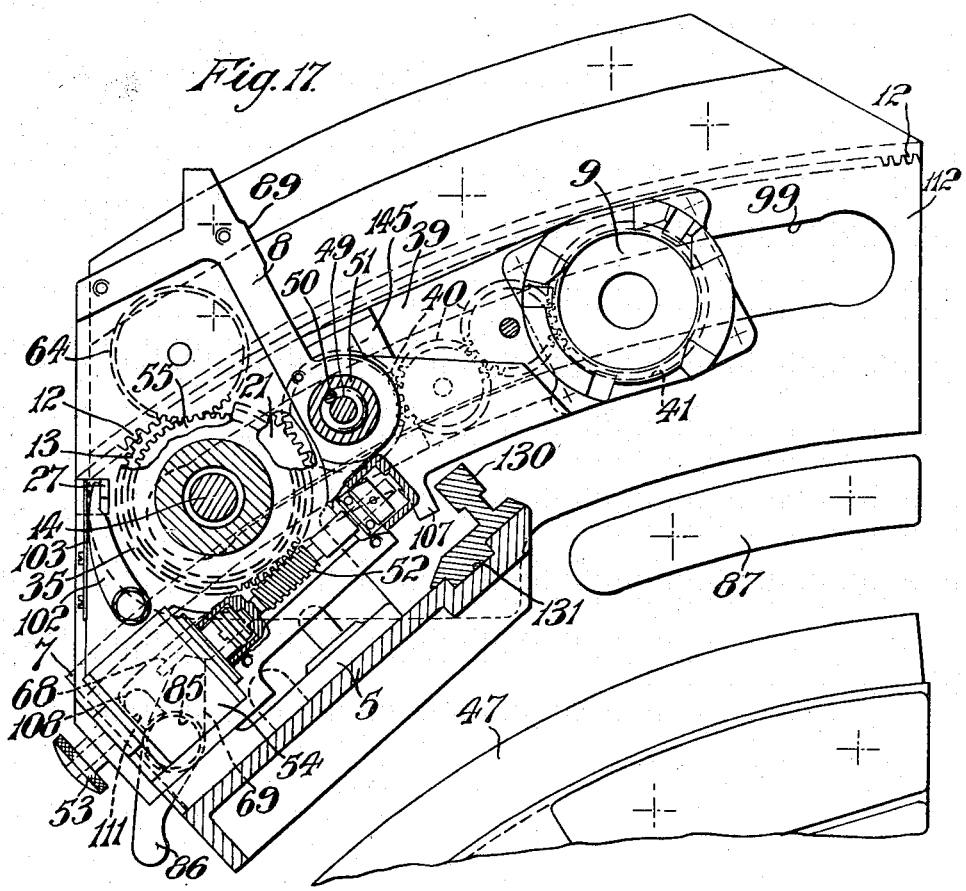
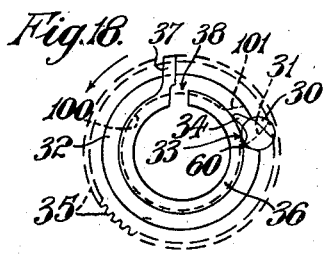
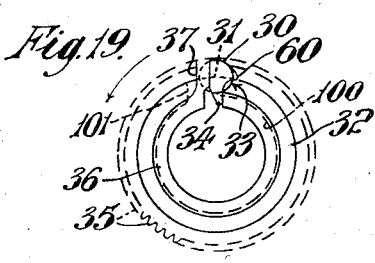
Inventors
Valentine P. Harvey and
Frank Parry
by Cushman, Darby & Cushman
Attorneys May 19, 1959 — V. P. HARVEY ET AL — 2,887,011
FUSE SETTER COMBINED WITH LOADING MECHANISM
Filed May 24, 1945 — 12 Sheets-Sheet 12
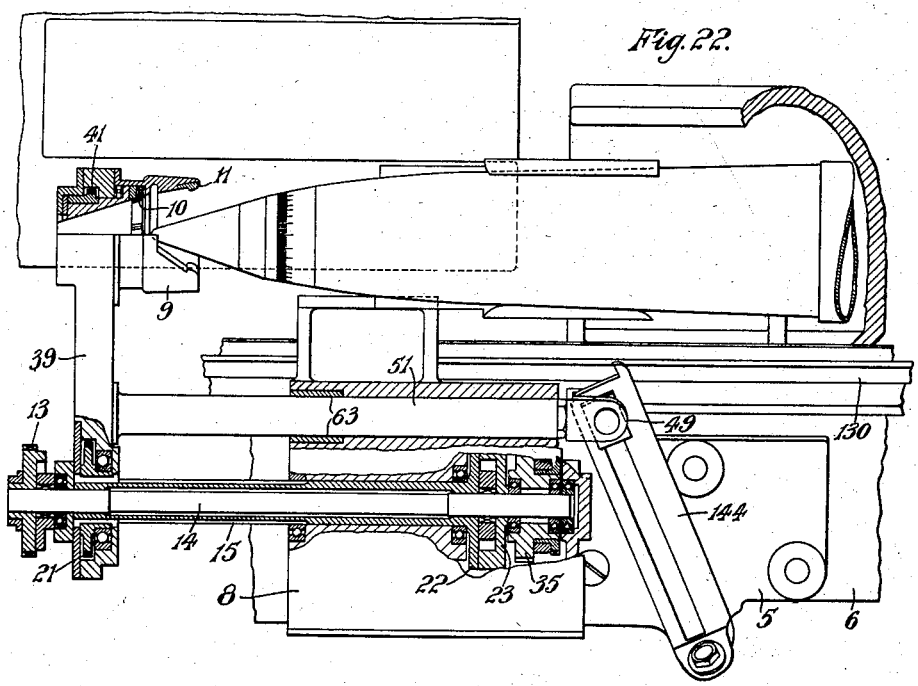
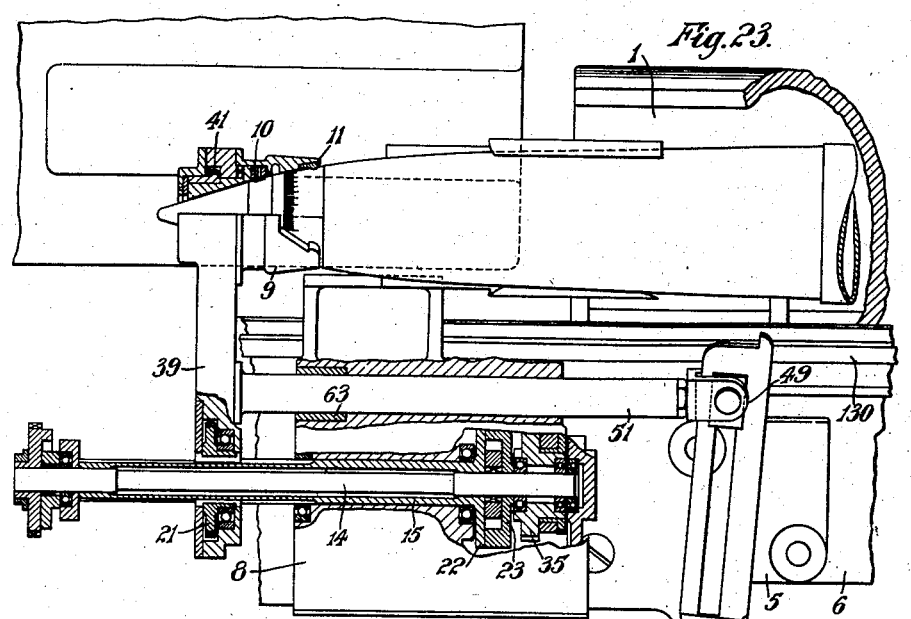
INVENTORS
Valentine Pearce Harvey and
Frank Parry
Cushman, Darby & Cushman United States Patent Office 2,887,011
Patented May 19, 1959

2,887,011

FUSE SETTER COMBINED WITH LOADING MECHANISM

Valentine Pearce Harvey and Frank Parry, Deptford, London, England, assignors to Molins Machine Company, Limited, London, England Application May 24, 1945, Serial No. 595,538

11 Claims. (Cl. 89—6.5)

This invention concerns improvements in or relating to automatic ordnance (hereinafter called a gun) of the quick firing kind which is provided with a loading tray movable between a position in rear of the breech (hereinafter called the "loading position") to a firing position in which the tray is offset from the breech so that it is out of the way of the latter during recoil, and wherein the breech-block is adapted and arranged to close automatically on the insertion of a round into the breech. Such a gun is referred to hereinafter as "a gun of the kind described."

In the specification of co-pending patent application U.S. Serial No. 488,453, filed May 25, 1943, in the names of Desmond Walter Molins, Valentine Pearce Harvey, James Arthur Mason, and Gordon Francis Wellington Powell, (now Patent No. 2,439,142), there has been described and claimed an automatic gun providing an automatic fuse-setting-loading firing cycle giving a substantially constant dead time for each round.

According to the present invention there is provided a gun of the kind described, comprising fuse-setting means carried on the loading tray and having a retractable head adapted to be moved lengthwise of a round in the tray to engage the fuse element of the round to set the fuse and to be withdrawn clear of the round after the fuse is set, means to couple the head to the tray for movement therewith during the aforesaid operation, means operable in timed relationship with the inward movement of the tray to the loading position to actuate the head to perform the aforesaid operations, means to uncouple the head from the tray after said operations are completed whereby the tray can continue its inward movement without the head, and means to prevent further inward movement of the head with tray after the head is so uncoupled. Means are provided for holding the fuse setter body and head still during ramming, and means are provided for restricting the angular movement of the fuse setter head and thereby of the fuse to confine the setting to values above the minimum and below the maximum as herein set forth. Stops are provided mounted on a non-recoiling part of the gun to prevent a round from entering the loading tray until the tray is in the firing position and means operated by the tray to release said stops. The fuse setter head is operated longitudinally by mechanism having a constant stroke and resiliently coupled thereto to accommodate rounds of differing lengths or according to their lengthwise disposition in the tray. The fuse setter is driven by gearing deriving its motion from the swinging movement of the setter relatively to the gun cradle for example by a pinion on the setter rolling on a rack on the cradle.

The gearing comprises a lost motion device whereby the fuse-setter head is caused to move into operative engagement with a fuse before the fuse-setting elements are set into operation.

Mechanism for a 5.25" anti-aircraft gun made in accordance with the invention will now be described by way of example with reference to the accompanying drawings in which:

Figure 1 is an elevation partly in section showing the fuse setter attached to the loading tray of the gun near the gun trunnion.

Figure 2 is an end elevation of Figure 1 but drawn to a somewhat larger scale and also shows the outline of the breech ring and the loading tray pivot.

Figure 3 is a plan of part of Figure 1 showing the mechanism for engaging the head with a fuse.

Figure 4 is a perspective view, partly exploded showing the driving and clutch mechanism of the fuse setter.

Figures 5 and 6 are a plan and elevation respectively of a clutch driving element shown in Figure 4.

Figures 7 and 8 are an end elevation and section respectively of a clutch driven element shown in Figure 4, which embodies a part hereinafter described as the movable stop of the fuse setter.

Figure 9 is an elevation of a disc forming part of the clutch mechanism shown in Figure 4.

Figure 10 is an end elevation of a worm wheel shown for convenience in two portions in Figure 4.

Figure 11 is a side elevation of part of the gun mounting showing the loading tray, fuse-setter and associated parts.

Figure 12 is an end view of Figure 11.

Figure 13 shows a few parts which are hidden in Figure 12.

Figure 14 is a side elevation generally similar to Figure 1 but shows chiefly the exterior of the fuse setter, with the neighboring parts of the gun in full lines, broken away in parts.

Figure 16 is a separate elevation of the fuse setter shown in Figure 1 drawn to a larger scale, partly in section, broken away in parts and with the cover plates removed.

Figure 17 is an end elevation of Figure 16 with an end cover plate of the fuse setter removed to show interior parts, the view also showing a few of the other parts shown in Figure 2.

Figures 18 and 19 are diagrams illustrating the engagement of the movable stop and the adjustable control member of the setter during the setting operation.

Figure 22 is a view looking down in the direction of the arrow "X" Figure 15 and partly in section on the line 22—22.

Figure 23 is a similar view to Figure 22 with the parts in a slightly different position.

Figure 15:
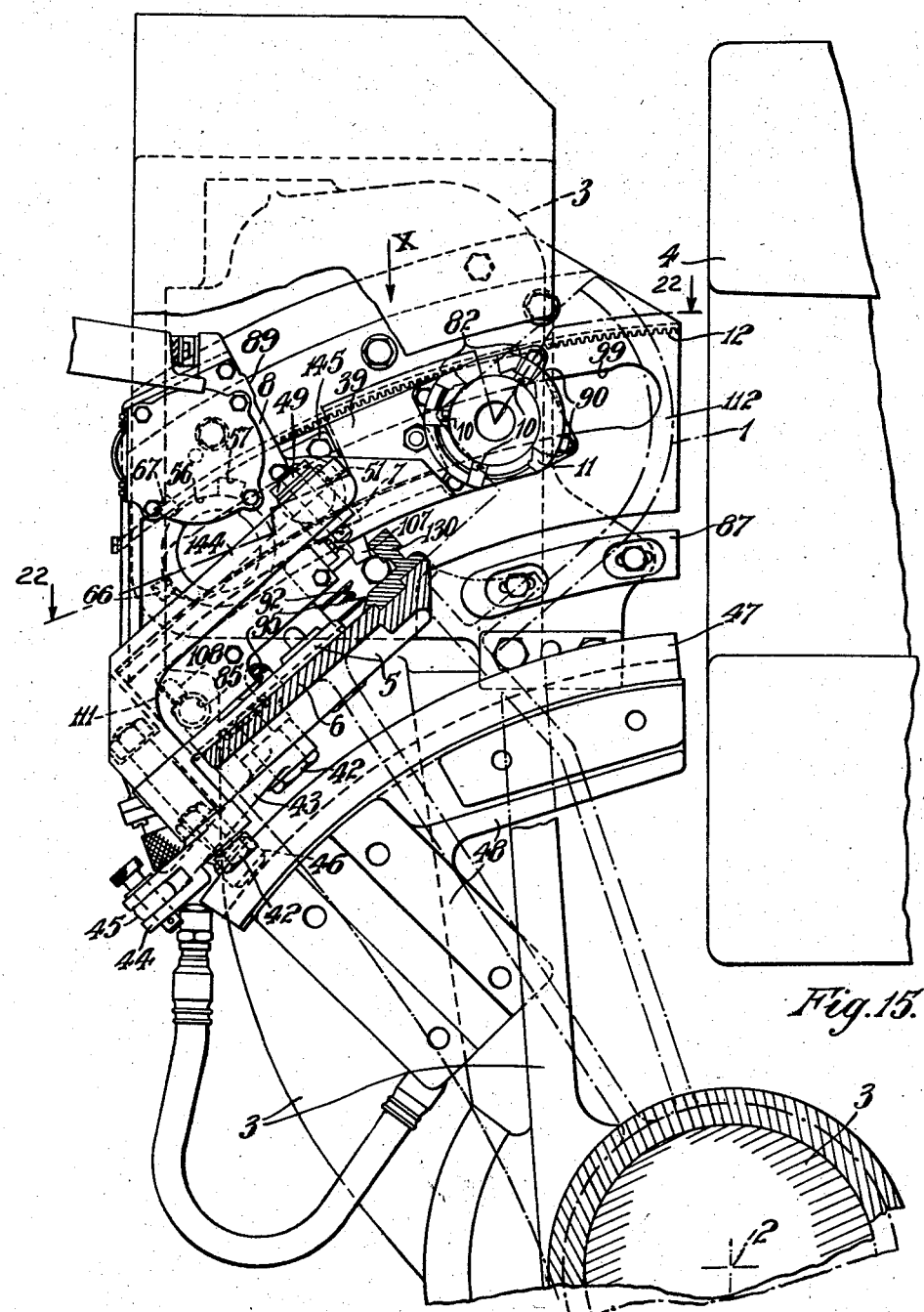
Figure 15 is an end elevation generally similar to Figure 2 but shows chiefly the exterior of the fuse setter with the neighboring parts of the gun in full lines, broken away in parts and the loading tray in chain lines.
Figure 20:
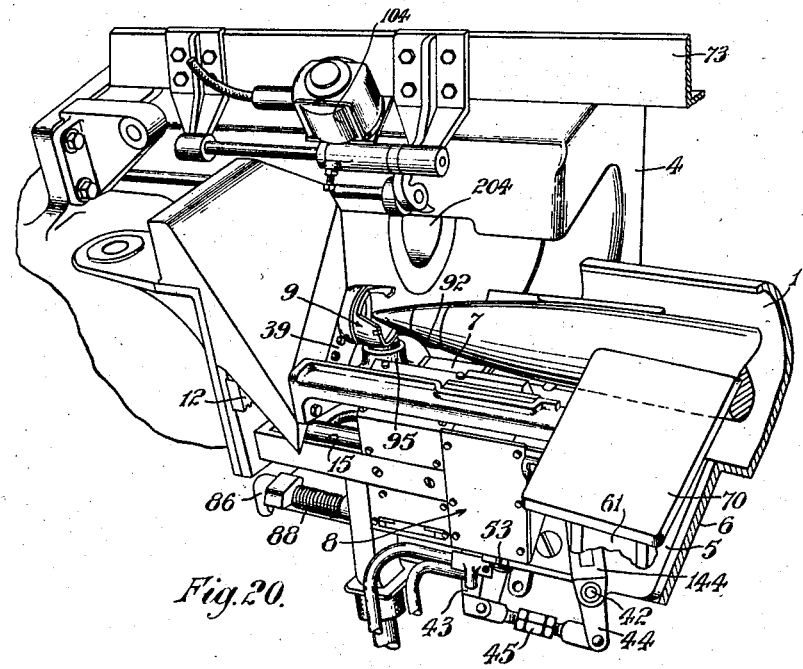
Figure 20 is a perspective sketch looking down towards the breech of the gun and showing the fuse setter in the initial position with a round ready to be engaged by the fuse setter head as the tray moves over towards the breech.
Figure 21:
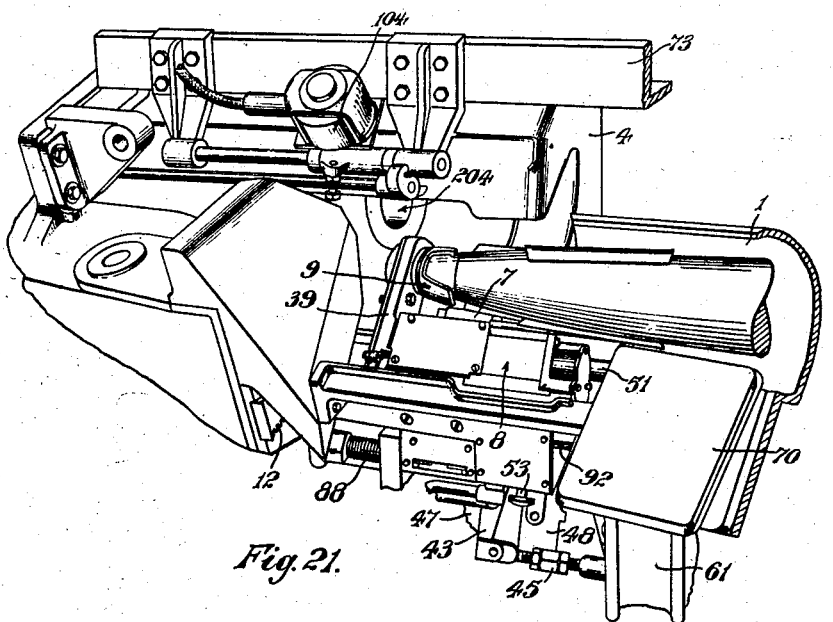
Figure 21 is a similar sketch to Figure 20, showing the fuse setter and tray further advanced towards the breech with the fuse setter head in engagement with the fuse.

Referring to Figures 1 to 10 and 14 and 15, the loading tray 1, best seen in Figures 14 and 15, is pivoted at 2 on the gun cradle 3 for swinging movements from a position in alignment with the breech 204 (the loading position) to a position clear of the recoiling parts of the gun (the firing position). In Figures 2 and 15 the tray is in the firing position and is indicated in chain lines in both figures, but in Figure 2 only a part of the tray is outlined. The breech 204 is shown in Figures 20 and 21 of the drawings and the breech ring is shown also in Figures 2 and 15 and marked 4.

The fuse-setter moving with the tray is arrested when a position is reached such that there will be the minimum safe clearance between the setter head and the round in the tray when the latter reaches the loading position and the round is rammed. The purpose of this arrangement is to permit the setting operation to be carried on up to the latest possible moment thus reducing the dead time and improving the accuracy of the firing.

For this purpose the fuse-setter is mounted on a base plate 5 which is fixed to a suitable flange or extension 6 of the tray, see Figures 14 and 15, and has a convex guide 7 fixed on its upper surface the curvature of the guide being concentric about the pivot 2 of the loading tray. The fuse-setting apparatus comprises a slide or body 8 adapted to slide over the convex guide at such times as the tray and guide are moving while the fuse-setting apparatus is held stationary by a cam-controlled clutch device to be described in detail later.

The fuse-setting apparatus is provided with a fuse-setting head 9 comprising a rotatable gripping device or ring of knives 10 and a non-rotatable gripping device 11 and this head which will be described in more detail later, normally occupies a position substantially in axial alignment with a round in the loading tray, see Figure 15 where the curve of the tray is concentric with the center of the head 9. When the apparatus is operated the head advances and engages the nose of the round, sets the fuse and then retires out of engagement with the round, all these movements taking place while the tray is swinging over from the firing position towards the loading position. When the head has completely disengaged, the fuse-setting apparatus is stopped from further movement with the tray while the latter, together with the base plate and convex guide, moves on to the loading position. The method of operating the fuse-setting apparatus to secure the above-mentioned effects and the general design of the apparatus will be understood from the following description.

A toothed rack 12 of a concave shape is fixed to a plate 112 mounted on a suitable facing on the gun cradle 3, the rack being arranged in a plane transverse to the gun axis. The pitch line of the rack is an arc concentric to the pivotal axis 2 of the loading tray.

A gear wheel 13, which constitutes the driving element of the fuse-setter engages the rack, and it will be seen that as the tray is swung towards the loading position the gear wheel will roll on the rack, in the direction of the arrow A, Figure 4, and as will be described more fully later provide the motion for operating the setter. The parts are shown in Figure 4 in positions chosen principally for the purpose of illustrating the shapes of the parts, but as will be better understood later, the gear wheel 13 is about to reverse and turn in the direction of the arrow B. It will, however, be understood that this is merely a convenient expedient for driving the setter and that the latter could be driven by a motor or the like. The following description of the driving and clutch devices will be better understood from Figures 1 and 4 to 10 and 16. The gear wheel 13 is journalled on the end of a shaft 14, called hereafter the driving shaft, journalled in a sleeve 15 mounted in bearings 16, Figure 1, in the body 8 of the setter so that its axis is parallel to the gun barrel axis, and the gear wheel 13 is provided on one flat face with a driving dog constituted by an arcuate ridge 17 of part of a ring concentric with the axis of the gear wheel and extending through an arc of 265° so that the ends of the ridge form driving faces. A cooperating member or driven dog is keyed to the driving shaft and comprises a small disc 19 with a projecting lug 20 having radial side faces which can engage the ends of the ridge on the gear wheel although there is considerable lost motion between them. In Figure 4 the faces of the ridge are 95° apart while the radial faces of the driven dog are 22° apart, so that there is 73° of lost motion before the drive is taken up. One end of the sleeve 15 abuts against a bearing 18, Figures 1 and 16, which also lies against the driven dog 19 and the sleeve has a gear wheel 21 splined thereto for axial movements along the sleeve and called, for convenience, the gripper driving gear, and refered to again later.

The other end of the sleeve 15 comprises a disc 22 and to this there is fixed a coaxial disc 23 spaced apart axially therefrom by a distance sufficient to allow room for a clutch driving element and a driven element to be accommodated between the opposed faces of the discs. The disc 23 is provided with three lugs 24 on one of its flat faces which abut the opposed face of the disc 22 on the sleeve 15 and the periphery of the disc 23 extends at these places beyond the end faces of the lugs to provide three arcuate lugs 25 which embrace the periphery of the sleeve disc 22. One of the peripheral extensions 25 just mentioned is further extended as a small block or abutment 26 which can engage at times with a plate or block 27, Figures 2 and 17, fixed on the body 8 of the setter and which constitutes the fixed stop. The two discs 22 and 23 are fixed together by screws passing through the lugs and parallel to the axis. The discs are provided with holes 28 and 29 respectively, see Figures 4 and 16, near the rim and so disposed that when the parts are assembled the holes are coaxial. These holes form journals for the driven element which comprises a cylindrical pin 30 of the same diameter as the hole 29 in the disc 23 and reduced at one end to a smaller diameter which is journalled in the hole 28 in the sleeve disc 22.

The driving shaft 14 extends beyond the right-hand face, Figures 1, 4 and 16, of the disc 23 for a purpose which will appear later. At the opposite end the shaft has a roller 98 on it which runs in a slot 99, Figures 1, 2 and 17, in the plate 112 fixed on the cradle as previously mentioned and further supports the shaft.

About midway along the length of that part of the driven element or pin 30 which lies between the opposed surfaces of the discs a transverse slot 31 is cut in the body of the pin extending from the periphery to the axis and so shaped that the bottom of the slot is a concave arc, see Figures 4 and 8. On that part of the driving shaft extending between the discs there is keyed the clutch driving element comprising a disc 32 having a semicircular groove 33 in its periphery of a radius equal to that of the driven element or pin 30. When the clutch is engaged, the cylindrical surface of the pin lies in the semicircular groove 33 so that as the clutch-driving element rotates it carries the pin round and consequently the two discs 22 and 23 also rotate. The driven element or pin extends through the disc 23 to the right-hand surface thereof, Figure 4, and has fixed to it a flat block 34 which lies against the outer flat surface of the disc 23 and is shaped as shown in Figure 7. The block is capable of engaging with an abutment (described below) on a worm wheel 35 which is rotatable on the aforesaid extension of the driving shaft 14.

On the flat face of the worm wheel 35 adjoining the disc 23 there is formed a ring-like boss 36 (shown broken away from the worm-wheel in Figure 4) projecting from said face and smaller in diameter than the wormwheel disc. At one part of the periphery of the projecting ring 36 there is an extension in the form of a thin strip 37 parallel to a radius of the wormwheel extending to the edge thereof and constituting an abutment. Next to said strip there is a groove 38 in the projecting ring 36 about the same width as the strip and extending towards the center of the wheel. The base of this groove is flush with the flat surface of the wormwheel 35. The wormwheel is mounted close to the disc 23 with the projecting ring 36 and abutment 37 adjacent thereto and consequently if the parts are rotated relatively to one another the block 34 will at times intercept the abutment 37 on the wormwheel as will be better understood from Figures 18 and 19 and the description in the next paragraph. The block 34 constitutes the movable stop of the setter and the abutment 37 constitutes the adjustable control member which is operated as described in the next paragraph.

From the foregoing description it will be clear that when the tray and setter are moving in towards the loading position the driving gear 13 will roll on the rack 12 and when the driving dogs 17 and 20 are in operative engagement the driving shaft 14 will be rotated and the clutch driving element 32 will turn with it, all the parts rotating in the direction of the arrow A Figure 4. The driving element is, during the early part of the movement in engagement with the driven element or pin 30 see Figure 18, and will thus carry the sleeve disc 22 and coaxial disc 23 and, of course, the sleeve 15 round with it. Eventually the block or movable stop 34 will come into engagement with the abutment 37 on the wormwheel and as will be clear from a comparison of Figures 18 and 19 will be turned thereby so that the driven element or pin 30 is rotated on its axis. During this movement the narrow end of the block 34 moves into the groove 38 next to the abutment or adjustable control member on the wormwheel see Figure 19. This is the position shown in Figure 19 where the part 34 is in alignment with the groove 38. While the block 34 is in the groove 38 the driven element and the wormwheel 35 are in driving engagement because the periphery of the disc 32 is engaging the arc of the groove 33 and the pin 30 cannot rotate. In consequence any wormwheel movements are transmitted to the sleeve 15 as explained later.

As the driven element or pin is rotated on its axis when the block 34 engages the abutment 37, the transverse groove 31 in the pin will be brought round into alignment with the disc 32 constituting the clutch driving element, that is, the parts are in the position shown in Figure 4. The disc therefore passes through the slot and the drive between the driving element 32 and the driven element 30 ceases (i.e. the clutch breaks). Meanwhile the rotational movement of the sleeve 15 has rotated the gripper driving gear 21 which as aforesaid, is splined to it. A small hump 60 on the block 34 rides on the outer surface of the ring 36 as shown in Figure 18 and prevents the driving pin 30 from rotating more than the prescribed amount.

The gear 21 is contained within a gear case 39, best seen in Figures 16 and 17 which extends to the fuse-setter head 9. A train of idler gears 40 transmits the motion to the other end of the casing 39 where the fuse-setter head 9 is located. The head is provided with a gear wheel 41 meshing with the last idler of the train, see Figures 2 and 17. The fuse-setter head is as aforesaid provided with two sets of gripping devices or knives, 10 and 11 one fixed and adapted to engage a fixed part of the fuse and the other rotatable and adapted to engage the movable part of the fuse.

In order to enable the fuse-setter head to be reciprocated axially to cause it to engage and disengage the round at the proper times, the base plate 5 is provided with two bearings in which are mounted the pivots 42 of levers 43 and 44 respectively, as shown best in Figure 3, forming parts of a cam-operated mechanism which is arranged to reciprocate the fuse-setter head as will now be explained. The free ends of the levers 43 and 44 are connected by a link 45. A cam roller 46 is pivoted at a suitable position along the lever 43 and is arranged to engage with a fixed cam track 47 adjustably fixed on a bracket 48, Figures 2 and 15 fixed to a bracket 61, Figures 1 and 14, extending from the gun cradle. Thus as the base-plate and fuse-setter move with the tray, the roller 46 runs along the cam 47 and operates the levers. The arm 144 of the lever 44 extends upwardly at an angle see Figures 1 and 2 and 14 and 15 and has a long slot 62 along its length. The slot engages one end of a rod 49 provided with a compression spring 50 and movable in a tube 51 which is slidable in a bush 63, Figure 3, fixed in the setter body and is parallel to the driving shaft 14. The tube is fixed at one end 145, Figures 2, 15 and 17 to the gear case 39 which contains the gear train and therefore the case is reciprocated longitudinally of the loading tray by the cam and during reciprocation it is also guided by the gripper driving gear 21 which slides on the sleeve 15 to which it is splined as previously explained.

The reciprocatory movement which is derived from the fixed cam 47 causes the slotted lever 144 to move the gear case to and fro through the medium of the spring device 49, 50, 51, thus enabling the setter head to engage with all rounds irrespective of their exact length or location lengthwise in the loading tray.

The wormwheel 35 of the fuse-setter is driven by a worm 52 best seen in Figure 17, which may be rotated by a follow-the-pointer handwheel represented here by a small knurled knob 53, Figures 1, 14, 16 and 17 or automatically through a remote-control device.

As shown in Figures 1, 2 and 17 the worm 52 is driven by an oil-pressure driven motor 54 forming part of said remote control device. On the hub of the wormwheel 35 there is mounted a further gear wheel 55 on the boss of which is adjustably fixed a ring 56 carrying a lug 57 which constitutes a stop piece. The gear wheel 55 is fixed by a pin 58 on the wormwheel hub which engages a slot 59 in the hub of 53. A gear wheel 64 engages with the gearwheel 55 and is fixed to the shaft of a device 63, which forms part of the remote control of the fuse-setter for determining what fuse is to be set, and accordingly forms no part of the invention. The lug 57 is restricted in its movements to the larger arc between two abutments 66 and 67 formed on the neighboring end plate of the setter body 8, see Figure 15. The purpose of this is to restrict the possible setting given to any fuse to values above the minimum and below the maximum possible. This is done for reasons of safety in accordance with established practice in anti-aircraft artillery. The abutments 66 and 67 prevent the wormwheel from moving beyond the limits established by the abutments. Thus as the wormwheel is moved in response to predictor movements the adjustable control member (i.e. the abutment 37 on the wormwheel 35) is moved round accordingly.

The remaining features of the construction will be mentioned in the following description of the operation of the gun and the setter during the loading and setting of a round.

A round is placed on a shelf or support on the gun cradle, constituted by two plates 70 and 71, Figures 11 and 12, and rolled towards the loading tray 1 which is then in the firing position, incompletely indicated by a chain line 1 in Figure 12. Guides and other devices under the control of the loading tray are provided to check the movement of the round if the tray is not in position ready to receive the round.

As shown, the guides are formed by brackets 72 fixed on a bar 73 which is attached at one end to a part of the cradle above the breech ring and at the other to a part of the counterweight system of the gun marked 74, Figure 12. The control devices consist of movable stops or plungers 75 mounted in brackets 76 fixed to the bar 73. Each stop comprises a rack 77 and quadrants 78 fixed to a shaft 79 operate the stops at the appropriate times. At one end of the shaft 79 is fixed a tappet 80 which engages at times with an abutment on the tray. Springs 81, Figure 12 keep the stops down and prevent a round from rolling off the shelf until the tray moves over to the firing position ready to receive it, whereupon the tray strikes the tappet and raises the stops. The round then falls down past the guides into the tray with the nose of the round in alignment with the setter head. In order to keep the stroke of the reciprocating setter head to a minimum, the head which, generally speaking, is formed as a hollow cone is slotted at 82, see Figures 2, 15 and 17, on the skirt or the periphery to allow the nose of the round to drop through the slot in close proximity to the apex of the cone, as shown in Figure 20.

The arrangement may be more clearly seen in Figure 22. In this figure, the fuse setter body is broken away to show the location of the tube 51 in the body, the rack gear and setting gears being illustrated as in Figure 16. In Figure 22, the round is clear of the setter head, that is, it has dropped down into the loading tray so that the nose of the round has passed through the top slot in the setter head. The setter and tray are just about to swing over towards the breech. The loading tray is then swung over to the loading position by an electric motor 83 which is geared to a crank (not shown) coupled to the tray by a connecting rod 84, pivoted to the balance-weight 97 of the tray Figure 12, thus causing the driving gear 13 to roll on the curved rack 12. During the early part of the tray movement the gear rolls idly because the driving dogs 17 and 20 are not yet in engagement. But the tray movement carries the setter base with it and the cam roller 46 runs on the fixed cam 47 and causes the head 9 to move into gripping engagement with the fuse. The position of the parts at this stage is more clearly shown in Figure 23 which is generally similar to Figure 22, but the setter and tray have swung over a little way as described above and the head has advanced by the motion of link 144, so that the knives of the fixed gripping device 11 are engaging the graduated ring shown which is fixed to the round body, while the knives of the movable gripping device 10 are engaging a movable fuse ring which is fixed to the nose of the round which rotates with said ring. Further movement of setter and tray beyond the position shown in Figure 23 will cause the member 10 to rotate and set fuse as described in more detail below. By the time those engagements are completed the driving dogs 17 and 20 have engaged and further movement of the tray causes the driving gear 13 to rotate the driving shaft 14, thus rotating the sleeve disc, coaxial disc and sleeve as previously described.

During this time the wormwheel of the setter is manipulated as usual by the follow-the-pointer handle (e.g., the knurled knob 53) or is operated by the oil motor 54, as the case may be, and these movements are followed by the adjustable control member 37 through the gearing and subject to the remote control devices already mentioned. When the adjustable control member intercepts the block or movable stop 34, the clutch breaks and no further rotary movement is transmitted by the driving gear 13 to the setter head 9, although the driving gear is still rolling on the rack. Ultimately the fixed cam 47 moves the levers 43 and 44 in the reverse direction and the setter head is disengaged from the round and very shortly after this the fuse-setter body is arrested from further movement with the tray as explained later although the latter continues to move on to the loading position. During the interval between the breaking of the clutch and the disengagement of the setter head, the head is moved by any movements which may be imparted to the wormwheel 35 in accordance with predictor indications as the movable stop and adjustable control member are in driving engagement (i.e. the part 34 is positively held in the groove 38 as previously explained). The stopping of the movement of the setter body with the tray is affected by a cam controlled clutch device as previously mentioned and this device is constructed as follows. It has already been explained that the setter is supported on the convex guide 7 fixed to the base plate 5 which is carried by the tray. The setter body has a stop notch in it constituted by a groove in the end of a bar 68, fixed to the setter body and which is adapted to be engaged by a pawl 69 fixed to a shaft 85, see Figures 15, 16 and 17, journalled in the base plate and parallel to the driving shaft. The free end of the pawl shaft extends to a position near to and below the curved rack and is there provided with a lever or wiper 86 adapted to engage an adjustably fixed cam 87, Figures 14, 15 and 17, mounted beneath the rack and of a similar curvature. The cam is located towards that end of the rack which is nearer to the breech so that the lever 86 moves freely for some distance before it encounters the cam. The pawl is normally pressed by a torsion spring 88 into operative engagement with the notch in the bar 68 so that during the time the setter is engaging, setting and disengaging from the fuse it is travelling with the tray. When the lever 86 encounters the fixed cam 87 the pawl 69 is rocked out of engagement with the notch and the setter ceases to move with the tray. To prevent further movement of the setter due to inertia the final location of the setter is determined by a stop consisting of a facing 89 on the setter body which comes against the breech ring 4. As the setter body then has freedom of movement on the convex guide in the reverse direction, an abutment 107 is employed to hold the setter body still during ramming until it is again moved back by the returning tray. This abutment is on the setter body and is engaged when ramming takes place by a lug 108 on the convex guide, which by its continued movement after the setter body 8 has stopped comes into contact with the abutment 107 at the end of the tray movement. Thus the round passes on with the tray and leaves the setter head and to enable this movement to take place another slot 90, see Figures 2, 15 and 17, is made in the skirt of the setter head and suitably located for this purpose. When the tray reaches the loading position the round is rammed into the breech 204 by the rammer 91 which is guided by a rail 130, fixed in a slot 131 in the base 5 and then the tray is moved back to the firing position. The rammer is operated by a cable 92, Figures 11 and 14, passing around pulleys 93, 94 and 95 and a drum 96. The drum is driven by an electric motor 97 geared by bevel gear wheels 120 and 121, as shown in Figure 12, to the drum.

During the return movement the lug 108 engages another abutment 111 on the setter body and thus causes it to be brought back to its proper position so that the pawl 69 can move into the notch 68 in the setter body when the fixed cam 87 permits this. The parts are then all in the position shown in Figure 2.

As the fuse-setting apparatus starts to move back, the driving gear rolls on the rack and naturally rotates in the reverse direction. This rotation is at first idle until the lost-motion between the driving dogs 17 and 20 is taken up and then the dogs engage and the driving shaft 14 begins to rotate in the direction of the arrow B, Figure 4. The taking up of the lost-motion in this way puts the dogs into proper angular relationship for the next setting operation. The rotation of the shaft 14 carries the clutch driving member 32 with it but this movement is idle for a time seeing that the disc 32 is merely passing through the slot 31 in the driven member or pin 30. The driving member 32 is provided with a further part not previously described which forms a means for engaging the driven member 30 and thus returning the sleeve disc 22, coaxial disc 23 and the sleeve 15 to their original positions. This part consists of a disc 100 integral with the driving member but of smaller diameter and having a projection 101 at one part of its periphery extending towards the circumference thereof, see Figures 5, 18 and 19. The projection is, as shown, in Figures 5 and 6, somewhat similar to a gear tooth in shape and one flank is formed as a concave arc of a radius equal to that of the pin forming the driven member. This arc is so located that it forms a continuation of the surface of the semi-circular groove 33 in the other disc 32. The flank in question is leading when the driving shaft 14 is moving in the reverse direction (Arrow B) now Figure 4 under discussion. As this flank meets the pin 30 the latter is engaged and thereafter the sleeve disc, coaxial disc and sleeve begin to rotate and continue to do so until the parts are back in their original position. But as the movement starts, the movable stop 34 is drawn out of the groove 38 in the wormwheel 35 and this causes the stop 34 to turn, which movement rotates the pin or driven element 30 on its axis and thus turns it in the semi-circular groove 33 in the clutch driving disc 32 to a position similar to that shown in Figure 15 and the disc 32 takes control of the pin and drives it although the pin is still in contact with the arc of the projection 101 of the associated disc.

When the parts return back to their original position, the abutment 26 on one lug 24 of the coaxial disc 23 engages the fixed stop 27 on the setter body. In its final movement to this position the abutment trips a pivoted pawl 102 controlled by a flat spring 103, see Figure 17. The end of the pawl moves behind the abutment 26 and holds the coaxial disc against unwarranted displacement. When a fresh setting operation starts, the spring pawl is tripped as soon as the driving dogs engage and the discs and sleeve are set in motion as the positive driving force of the wheel 13 and the rack 12 easily turns the pawl anticlockwise, Figure 17, against the weak pressure of the spring 103.

Thus the arrangement is broadly similar to that described and shown in the specification of copending United States application, Serial No. 488,453 (now Patent No. 2,439,142), but in the particular example shown in the drawings of this other case there is no separate motor and cycle for the fuse-setting. The first motor to come into operation is in the present example the tray-motor 83 the fuse being set whilst the tray is swinging in. The tray-motor is stopped and reversed and the rammer-motor is started and stalled and reversed as described and shown in the complete specification of United States application, Serial No. 488,453 (now Patent No. 2,439,142), the tray and rammer being returned under the control of the breech-block closing movement. Automatic firing mechanism is provided and this may be according to either of the modifications described in the complete specification of United States application, Serial No. 488,453 (now Patent No. 2,439,142). Alternatively and as shown herein electrically controlled firing mechanism is employed. A solenoid 104, Figure 13, is energised as the tray reaches the firing position and operates a lever 105 which operates a further lever 106 fixed to a shaft 109 which passes to the firing mechanism of the gun. The control may be energised either when the breech closes or when the tray reaches the firing position. The latter method should be used where there is no interlock between the breech-block and the tray to prevent the breech-block from fully closing before the tray is in the firing position, because the breech-block, if unrestricted, closes more quickly than the tray, moves to the firing position and therefore the breech will already be closed before the tray actuates the firing mechanism, whether electrically or mechanically as in the second example in the specification of United States application, Serial No. 488,453 (now Patent No. 2,439,142). It will be seen from the foregoing that the arrangement of automatic setting-loading-firing cycle described herein provides a short and constant dead-time for each round.

The construction described herein is also applicable to 4.5" anti-aircraft guns and can be fitted to such guns without modification.

It is sometimes necessary to use a gun equipped in this manner for firing armour piercing or other projectiles which do not have time fuses and it is then necessary to put the fuse-setter out of gear. This is done by removing the left hand pivot Figure 1, of the link 45 and connecting the link to a bracket 110 fixed on the base-plate 5. Thus although the setter still moves with the tray the setter-head does not reciprocate and rounds of the kind mentioned above can be loaded and fired without hindrance by the setter.

Having now particularly described and ascertained the nature of our said invention, and in what manner the same is to be performed, we declare that what we claim is:

1. A gun comprising in combination a breech, a loading tray, means mounting said tray for movement between a loading position in alignment with the breech and a firing position in which latter position the tray is bodily offset from the breech so that it is out of the way of the latter during recoil and is properly positioned to receive a round, fuse-setting means carried on the loading tray and having a retractable head, comprising a ring carrying fuse-setting elements adapted to grip the fuse element of a round, means to move said head lengthwise of a round in the tray to fit the said ring over the nose of the round to engage and grip the fuse element of the round by means of said fuse-setting elements, means to couple the head to the tray for movement therewith, means operable by and in timed relationship with the inward movement of the tray to the loading position to actuate the head and the said ring to set the fuse of the round during said inward movement, means to withdraw the head clear of the round after the fuse is set and before the tray reaches the loading position, means to uncouple the head from the tray after the head is withdrawn clear of the round so as to permit relative movement between the tray and the head such that the tray can continue its inward movement to the loading position without the head, and means to prevent further movement of the head with the tray during said inward movement after the head is so uncoupled.

2. A gun comprising in combination a breech, a loading tray, means mounting said tray for movement between a loading position in alignment with the breech and a firing position in which latter position the tray is bodily offset from the breech so that it is out of the way of the latter during recoil and is properly positioned to receive a round, fuse-setting means carried on the loading tray and having a retractable head comprising a ring carrying fuse-setting elements adapted to grip the fuse element of a round, means to move said head lengthwise of a round in the tray to fit the said ring over the nose of the round and to engage and grip the fuse element of the round by means of the said fuse-setting elements, means to couple the head to the tray for movement therewith, means operable by and in timed relationship with the inward movement of the tray to the loading position to cause angular movement of the said ring to set the fuse of the round during said inward movement, means for restricting the angular movement of the said ring and thereby of the fuse to confine the setting to values above a desired minimum and below a desired maximum, means to withdraw the head clear of the round after the fuse is set and before the tray reaches the loading position, means to uncouple the head from the tray after the head is withdrawn clear of the round so as to permit relative movement between the tray and the head such that the tray can continue its inward movement to the loading position without the head, and means to prevent further movement of the head with the tray during said inward movement after the head is so uncoupled.

3. A gun comprising in combination a breech, a loading tray, means mounting said tray for movement between a loading position in alignment with the breech and a firing position in which latter position the tray is bodily offset from the breech so that it is out of the way of the latter during recoil and is properly positioned to receive a round, fuse-setting means carried on the loading tray and having a retractable head comprising a ring carrying fuse-setting elements adapted to grip the fuse element of a round, means to move said head lengthwise of a round in the tray to fit the said ring over the nose of the round and to engage and grip the fuse element of the round by means of the said fuse-setting elements, said means to move the head lengthwise comprising mechanism having a constant stroke and resiliently coupled to the head to accommodate rounds according to the position of their fuse elements in the tray, means to couple the head to the tray for movement therewith, means operable by and in timed relationship with the inward movement of the tray to the loading position to actuate the head and the said ring to set the fuse of the round during said inward movement, means to withdraw the head clear of the round after the fuse is set and before the tray reaches the loading position, means to uncouple the head from the tray after the head is withdrawn clear of the round so as to permit relative movement between the tray and the head such that the tray can continue its inward movement to the loading position without the head, and means to prevent further movement of the head with the tray during said inward movement after the head is so uncoupled.

4. A gun comprising in combination a breech, a loading tray, means mounting said tray for movement between a loading position in alignment with the breech and a firing position in which latter position the tray is bodily offset from the breech so that it is out of the way of the latter during recoil and is properly positioned to receive a round, fuse-setting means carried on the loading tray and having a retractable head comprising a ring carrying fuse-setting elements adapted to grip the fuse element of a round, means to move said head lengthwise of a round in the tray to fit the said ring over the nose of the round and to engage and grip the fuse element of the round by means of the said fuse-setting elements, said means to move the head lengthwise comprising mechanism having a constant stroke and resiliently coupled to the head to accommodate rounds according to the position of their fuse elements in the tray, means to couple the head to the tray for movement therewith, means operable by and in timed relationship with the inward movement of the tray to the loading position to cause angular movement of the said ring to set the fuse of the round during said inward movement, means for restricting the angular movement of the said ring and thereby of the fuse to confine the setting to values above a desired minimum and below a desired maximum, means to withdraw the head clear of the round after the fuse is set and before the tray reaches the loading position, means to uncouple the head from the tray after the head is withdrawn clear of the round so as to permit relative movement between the tray and the head such that the tray can continue its inward movement to the loading position without the head, and means to prevent further movement of the head with the tray during said inward movement after the head is so uncoupled.

5. A gun comprising in combination a breech, a loading tray, means mounting said tray for movement between a loading position in alignment with the breech and a firing position in which latter position the tray is bodily offset from the breech so that it is out of the way of the latter during recoil and is properly positioned to receive a round, fuse-setting means carried on the loading tray and having a retractable head comprising a ring carrying fuse-setting elements adapted to grip the fuse element of a round, means to move said head lengthwise of a round in the tray to fit the said ring over the nose of the round and to engage and grip the fuse element of the round by means of the said fuse-setting elements, means to couple the head to the tray for movement therewith, gearing deriving its motion from the movement of the fuse-setting means with the tray relatively to the gun cradle, and operable by and in timed relationship with the inward movement of the tray to the loading position to actuate the head and the said ring to set the fuse of the round, means to withdraw the head clear of the round after the fuse is set and before the tray reaches the loading position, means to uncouple the head from the tray after the head is withdrawn clear of the round so as to permit relative movement between the tray and the head such that the tray can continue its inward movement to the loading position without the head and means to prevent further movement of the head with the tray during said inward movement after the head is so uncoupled.

6. A gun comprising in combination a breech, a loading tray, means mounting said tray for movement between a loading position in alignment with the breech and a firing position in which latter position the tray is bodily offset from the breech so that it is out of the way of the latter during recoil and is properly positioned to receive a round, fuse-setting means carried on the loading tray and having a retractable head comprising a ring carrying fuse-setting elements adapted to grip the fuse element of a round, means to move said head lengthwise of a round in the tray to fit the said ring over the nose of the round and to engage and grip the fuse element of the round by means of the said fuse-setting elements, means to couple the head to the tray for movement therewith, gearing deriving its motion from the movement of the fuse-setting means with the tray relatively to the gun cradle, and operable by and in timed relationship with the inward movement of the tray to the loading position to cause angular movement of the said ring to set the fuse of the round, means for restricting the angular movement of the fuse-setter head and thereby of the fuse to confine the setting to values above a desired minimum and below a desired maximum, means to withdraw the head clear of the round after the fuse is set and before the tray reaches the loading position, means to uncouple the head from the tray after the head is withdrawn clear of the round so as to permit relative movement between the tray and the head such that the tray can continue its inward movement to the loading position without the head, and means to prevent further movement of the head with the tray during said inward movement after the head is so uncoupled.

7. A gun comprising in combination a breech, a loading tray, means mounting said tray for movement between a loading position in alignment with the breech and a firing position in which latter position the tray is bodily offset from the breech so that it is out of the way of the latter during recoil and is properly positioned to receive a round, fuse-setting means carried on the loading tray and having a retractable head compising a ring carrying fuse-setting elements adapted to grip the fuse element of a round, means to move said head lengthwise of a round in the tray to fit the said ring over the nose of the round and to engage and grip the fuse element of the round by means of the said fuse-setting elements, said means to move the head lengthwise comprising mechanism having a constant stroke and resiliently coupled to the head to accommodate rounds according to the position of their fuse elements in the tray, means to couple the head to the tray for movement therewith, gearing deriving its motion from the movement of the fuse-setting means with the tray relatively to the gun cradle, and operable by and in timed relationship with the inward movement of the tray to the loading position to actuate the head and said ring to set the fuse of the round, means to withdraw the head clear of the round after the fuse is set and before the tray reaches the loading position, means to uncouple the head from the tray after the head is withdrawn clear of the round so as to permit relative movement between the head and the tray such that the tray can continue its inward movement to the loading position without the head, and means to prevent further movement of the head with the tray during said inward movement after the head is so uncoupled.

8. A gun comprising in combination a breech, a loading tray, means mounting said tray for movement between a loading position in alignment with the breech and a firing position in which latter position the tray is bodily offset from the breech so that it is out of the way of the latter during recoil and is properly positioned to receive a round, fuse-setting means carried on the loading tray and having a retractable head comprising a ring carrying fuse-setting elements adapted to grip the fuse element of a round, means to move said head lengthwise of a round in the tray to fit the said ring over the nose of the round and to engage and grip the fuse element of the round by means of the said fuse-setting elements, means to couple the head to the tray for movement therewith, means operable in timed relationship with the inward movement of the tray to the loading position to actuate the head and said ring to set the fuse of the round, said last-named means comprising a rack on the gun cradle and a pinion on the fuse-setter rolling on said rack, means to withdraw the head clear of the round after the fuse is set and before the tray reaches the loading position, means to uncouple the head from the tray after the head is withdrawn clear of the round so as to permit relative movement between the tray and the head such that the tray can continue its inward movement to the loading position without the head, and means to prevent further movement of the head with the tray during said inward movement after the head is uncoupled.

9. A gun comprising in combination a breech, a loading tray, means mounting said tray for movement between a loading position in alignment with the breech and a firing position in which latter position the tray is bodily offset from the breech so that it is out of the way of the latter during recoil and is properly positioned to receive a round, fuse-setting means carried on the loading tray and having a retractable head comprising a ring carrying fuse-setting elements adapted to grip the fuse element of a round, means to move said head lengthwise of a round in the tray to fit the said ring over the nose of the round and to engage and grip the fuse element of the round by means of the said fuse-setting elements, means to couple the head to the tray for movement therewith, gearing deriving its motion from the movement of the fuse-setting means with the tray relatively to the gun cradle, and operable by and in timed relationship with the inward movement of the tray to the loading position to actuate the head and said ring to set the fuse of the round, said gearing comprising a lost motion device whereby the operation of the fuse-setting elements is delayed until the fuse-setter head has been caused to move into operative engagement with a fuse, means to withdraw the head clear of the round after the fuse is set and before the tray reaches the loading position, means to uncouple the head from the tray after the head is withdrawn clear of the round so as to permit relative movement between the tray and the head such that the tray can continue its inward movement to the loading position without the head, and means to prevent further movement of the head with the tray during said inward movement after the head is so uncoupled.

10. A gun comprising in combination a breech, a loading tray, means mounting said tray for movement between a loading position in alignment with the breech and a firing position in which latter position the tray is bodily offset from the breech so that it is out of the way of the latter during recoil and is properly positioned to receive a round, fuse-setting means carried on the loading tray and having a retractable head comprising a ring carrying fuse-setting elements adapted to grip the fuse element of a round, means to move said head lengthwise of a round in the tray to fit the said ring over the nose of the round and to engage and grip the fuse element of the round by means of the said fuse-setting elements, means to couple the head to the tray for movement therewith, gearing deriving its motion from the movement of the fuse-setting means with the tray relatively to the gun cradle, and operable by and in timed relationship with the inward movement of the tray to the loading position to cause angular movement of the said ring to set the fuse of the round, said gearing comprising a lost motion device whereby the operation of the fuse-setting elements is delayed until the fuse-setter head has been caused to move into operative engagement with a fuse, means for restricting the angular movement of the said ring and thereby of the fuse to confine the setting to values above a desired minimum and below a desired maximum, means to withdraw the head clear of the round after the fuse is set and before the tray reaches the loading position, means to uncouple the head from the tray after the head is withdrawn clear of the round so as to permit relative movement between the tray and the head such that the tray can continue its inward movement to the loading position without the head, and means to prevent further movement of the head with the tray during said inward movement after the head is so uncoupled.

11. A gun comprising in combination a breech, a loading tray, means mounting said tray for movement between a loading position in alignment with the breech and a firing position in which latter position the tray is bodily offset from the breech so that it is out of the way of the latter during recoil and is properly positioned to receive a round, fuse-setting means carried on the loading tray and having a retractable head comprising a ring carrying fuse-setting elements adapted to grip the fuse-element of a round, means to move said head lengthwise of a round in the tray to fit the said ring over the nose of the round and to engage and grip the fuse element of the round by means of the said fuse-setting elements, means to couple the head to the tray for movement therewith, means operable in timed relationship with the inward movement of the tray to the loading position to actuate the head and said ring to set the fuse of the round, said last-named means comprising a rack on the gun cradle and a pinion on the fuse-setter rolling on said rack and a lost-motion device whereby the operation of the fuse-setting elements is delayed until the fuse-setter head has been caused to move into operative engagement with a fuse, means to withdraw the head clear of the round after the fuse is set and before the tray reaches the loading position, means to uncouple the head from the tray after the head is withdrawn clear of the round so as to permit relative movement between the tray and the head such that the tray can continue its inward movement to the loading position without the head, and means to prevent further movement of the head with the tray during said inward movement after the head is so uncoupled.

References Cited in the file of this patent

UNITED STATES PATENTS

| | | |
|---|---|---|
| 699,900 | Schneider et al. | May 13, 1902 |
| 1,332,763 | Schneider | Mar. 2, 1920 |
| 1,441,535 | Morse | Jan. 9, 1933 |
| 2,442,401 | Dabrasky et al. | June 1, 1948 |
| 2,450,553 | Jorgensen | Oct. 5, 1948 |

FOREIGN PATENTS

| | | |
|---|---|---|
| 22,167 | France | Dec. 14, 1920 |
| | (Addition to 502,198) | |
| 125,442 | Great Britain | Apr. 24, 1919 |
| 398,081 | Great Britain | Sept. 7, 1933 |